United States Patent [19]
Suyama et al.

[11] Patent Number: 5,258,465
[45] Date of Patent: Nov. 2, 1993

[54] POLYMERIC PEROXIDE, POLYMERIZATION INITIATOR AND METHOD FOR PRODUCTION OF BLOCK COPOLYMER

[75] Inventors: Shuji Suyama; Yasumasa Watanabe; Hideyo Ishigaki; Hiromi Kumura, all of Aichi, Japan

[73] Assignee: Nippon Oil & Fats Co., Ltd., Tokyo, Japan

[21] Appl. No.: 703,832

[22] Filed: May 21, 1991

[30] Foreign Application Priority Data

May 29, 1990 [JP] Japan .................................. 2-137099

[51] Int. Cl.$^5$ .................. C07C 409/00; C07C 409/30; C07C 409/34; C07C 409/38
[52] U.S. Cl. .................. 525/263; 526/232.3; 526/227; 526/232; 526/230; 526/213; 568/561; 568/566; 560/302
[58] Field of Search ................ 525/263; 526/230, 232, 526/232.3; 560/302; 568/561, 558, 564, 566, 567

[56] References Cited

U.S. PATENT DOCUMENTS

| | | | |
|---|---|---|---|
| 4,469,862 | 9/1984 | Komai et al. | 526/232.3 |
| 4,705,888 | 11/1987 | Meijer et al. | 526/232 |
| 4,954,656 | 9/1990 | Suyama et al. | 568/567 |
| 5,012,010 | 4/1991 | Suyama et al. | 568/561 |
| 5,041,624 | 8/1991 | Suyama et al. | 560/302 |
| 5,117,047 | 5/1992 | Suyama et al. | 560/302 |

FOREIGN PATENT DOCUMENTS 0364169 4/1990 European Pat. Off. .
2065673 7/1981 United Kingdom .

Primary Examiner—James J. Seidleck
Assistant Examiner—M. L. Warzel
Attorney, Agent, or Firm—Oblon, Spivak, McClelland, Maier & Neustadt

[57] ABSTRACT

An ester type polymeric peroxide; has a peroxide group of the formula (I):

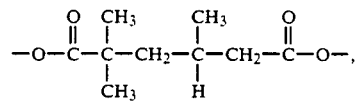

a group of the formula (I')

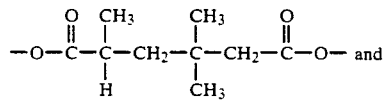

and a group of the formula (II)

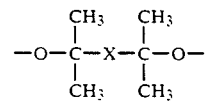

wherein X stands for one member selected from the group consisting of $-CH_2-CH_2-$, $-C\equiv C-$ and

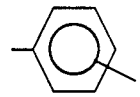

continuously bound such that I and I' occur randomly in alternation with II, having a (I):(I') molar ratio in the range of from 9:1 to 1:9 and the [(I)+(I')]:(II) molar ratio in the range of from 6:4 to 4:6, and having an average molecular weight in the range of from 1,000 to 20,000, a polymerization initiator for vinyl type monomer comprising said ester type polymeric peroxide and method for the production of a block copolymer of vinyl type monomer by said polymerization initiator.

8 Claims, 1 Drawing Sheet

FIG.1

POLYMERIC PEROXIDE, POLYMERIZATION INITIATOR AND METHOD FOR PRODUCTION OF BLOCK COPOLYMER

BACKGROUND OF THE INVENTION

1. Field of the Invention

This invention relates to a novel polymeric peroxide possessing three types of peroxide groups differing in thermal decomposition rates. This invention further relates to a polymerization initiator having the polymeric peroxide as an active agent for a monomer having a vinyl group and to a method for the production of a block copolymer by polymerizing monomers having a vinyl group in two stages by the use of the polymeric peroxide.

2. Description of the Prior Art

Known polymeric peroxides having at least two peroxide groups in the molecular unit include some which have peroxide groups having the same thermal decomposition rate and some which have peroxide groups having different thermal decomposition rates. As polymeric peroxides of the former type, there have been reported a diacyl type polymeric peroxide formed by the reaction of phthalic acid chloride with sodium peroxide [Berichte der Deutschen Chemischen Gesellschaft, Vol. 27, p. 1,510 (1894)], a diacyl type polymeric peroxide formed by the reaction of an oxalyl chloride with sodium peroxide [Journal of the American Chemical Society, Vol. 68, p. 534 (1946)], and diacyl type polymeric peroxides represented by the following general formula and obtained by the reaction of an aliphatic dibasic acid chloride with sodium peroxide [Chemical Abstracts, Vol. 60, 5293d and 10892e (1964)].

(wherein n is in the range of from 2 to 10 and x is in the range of from 16 to 35).

As the polymeric peroxides of the latter class, there have been reported a polymeric peroxide obtained by the reaction of a substituted succinic acid chloride and p-diisopropylbenzene dihydroperoxide [Journal of Organic Chemistry, U.S.S.R., Vol. 13, No. 1, p. 210 (1977)] and polymeric peroxides having the following two groups bound to each other [Japanese Patent Public Disclosure SHO 59(1984)-8727].

(wherein $X_1$ stands for a $-CH_2-CH_2-$ group or a $-C\equiv C-$ group).

Generally, polymeric peroxides are useful as a polymerization initiator for the production of a block copolymer from a vinyl type monomer. To be more specific, the production of a block copolymer by the use of a polymeric peroxide is effected by polymerization involving the following two stages.

(1) In the first stage, a vinyl type monomer is polymerized with a polymeric peroxide as a polymerization initiator to form a first-stage polymer having a fixed amount of the peroxide group of the polymeric peroxide chemically bound to a polymer chain.

(2) In the second stage, the first-stage polymer possessing the peroxide group is purified, if necessary, then mixed with a vinyl type monomer of a type different from that of the first-stage polymer, and subjected to a second-stage polymerization using the peroxide group chemically bound to a polymer chain in the polymer as a polymerization initiator to give rise to a block copolymer of the two vinyl type monomers.

The first-stage polymerization, however, does not easily produce the polymer possessing the peroxide in a high yield. In order for the peroxide group of the polymeric peroxide to be chemically bound to the polymer chain without fail, the radical for initiating the polymerization is required to be of a structure substituted with at least one peroxide group. The polymer which is obtained by the ordinary polymerization mechanism using the radical of the kind described above possesses a peroxide group at the terminal thereof. If the radical to be used is of the ordinary type possessing no peroxide group, the produced polymer has no peroxide group at the terminal thereof. Thus, the second-stage polymerization is incapable of producing a block copolymer. If the produced polymer possesses a peroxide group at the terminal, the thermal decomposition property of the peroxide group must be such as to avoid generating a radical under the conditions of the first-stage polymerization. Otherwise, the first-stage polymerization causes the terminal peroxide group to generate a radical which induces a polymerization reaction. As a result, the first-stage polymerization produces a polymer containing no peroxide group.

For the purpose of enabling the second-stage polymerization to produce the block copolymer in a high yield, the first-stage polymerization must exhibit as high selectively for the polymer possessing a peroxide group as possible. For this reason, the selection of the polymeric peroxide to be used becomes an important factor.

In all of the known polymeric peroxides mentioned above, the two or more peroxide groups present in the molecular units have relatively small differences or no difference in their thermal decomposition rates. When the block copolymerization is carried out using such a polymeric peroxide, it produces the block copolymer only in a low yield.

A need has therefore been felt for the development of a polymeric peroxide which possess in the molecular unit thereof two or more peroxide groups exhibiting widely different thermal decomposition rates.

SUMMARY OF THE INVENTION

The present inventors made a study of polymeric peroxides and, as a result, found that the novel polymeric peroxide described hereinbelow satisfied this desire. The present invention was completed as a result.

The present invention is specifically directed to an ester type polymeric peroxide having a group of the formula (I)

a group of the formula (I)' a group of the formula (II)

wherein X stands for one member selected from the group consisting of —CH$_2$—CH$_2$—, —C≡C— and continuously bound such that I and I' occur randomly in alternation with II, having a (I):(I)' molar ratio in the range of from 9:1 to 1:9 and a [(I)+(I)'']:(II) molar ratio in the range of from 6:4 to 4:6, and having an average molecular weight in the range of from 1,000 to 20,000 to a polymerization initiator having the polymeric peroxide as an active agent for a monomer having a vinyl group and to a method for the production of a block copolymer by polymerizing monomers having a vinyl group in two stages by the use of the polymeric peroxide.

DETAILED DESCRIPTION OF THE PREFERRED EMBODIMENT

The ester type polymeric peroxide of this invention can be produced, for example, by causing a chloride represented by the general formula:

a (wherein R and R' stand for a methyl group or a hydrogen atom but are not the same and the ratio of the two isomers differing in R and R' is in the range of from 9:1 to 1:9) to react with a hydroperoxide represented by the general formula:

(wherein X stands for a —CH$_2$—CH$_2$— group, a —C≡C— group, or a group) in the presence of an alkali.

In this reaction, the molar ratio of the acid chloride to the hydroperoxide is desired to be in the range of from 6:4 to 4:6. If the molar ratio is outside of this range, the produced polymeric peroxide has a low molecular weight and is substantially deficient in effectiveness. The alkali used in the reaction is an amine such as pyridine, an inorganic base such as potassium hydroxide or sodium hydroxide, or an aqueous solution thereof. The reaction may use a solvent such as benzene, toluene, ether, or methylene chloride. The reaction conditions, are similar to those of the reaction for the ordinary peroxy ester. Specifically, the reaction temperature is in the range of from 0° C. to 20° C. and the reaction time in the range of from one to three hours.

The ester type polymeric peroxide of this invention is obtained by the condensation peresterification reaction between the acid chloride and the hydroperoxide attended by the elimination of hydrochloric acid. It is a compound having the component unit I, I', and II. Furthermore, since the structure of the acid chloride is bilaterally unsymmetrical, it is easily understood that the bonding form between the component unit I or I' and the component unit II is head-to-head and head-to-tail random bonds. In light of the raw materials participating in the reaction, the terminal group of the polymeric peroxide ought to be either a carboxyl group or a hydroperoxide group.

Though the molecular weight of the ester type polymeric peroxide of this invention is variable with the molar ratio between the reactants and the reaction conditions, it is theoretically infinite when the reactants are in equimolar amounts. In reality, however, the molecular weight is limited by side reactions. The average molecular weight of the ester type polymeric peroxide is in the range of from 1,000 to 20,000 when the conditions of the synthesis are in the aforementioned ranges.

The infrared absorption spectrum of the ester type polymeric peroxide produced according to the invention as described above shows it to contain the C=O bond of the ester and the O—O bond of the peroxide. The chemical structure of the compound was determined from the nuclear magnetic resonance spectrum. Further, the amount of the peroxide group possessed by the compound can be determined from the amount of active oxygen and the thermal stability of peroxide group can be determined by the measurement of the thermal decomposition rate.

The ester type polymeric peroxide of this invention possesses three types of peroxide groups respectively containing tertiary, secondary, and primary acyl groups. The temperatures at which the respective peroxide groups are decomposed to 50% in 10 hours (hereinafter referred to as "10-hour half-life temperature") fall in the ranges of from 41° C. to 51° C., from 62° C. to 71° C., and from 87° C. to 100° C..

The radical polymerization initiator having as an active component thereof the aforementioned polymeric peroxide of this invention exhibits an outstanding characteristic in the production of the block copolymer. The polymerization by the two stages can be realized and the block copolymer is easily produced by making ideally selective use of the decomposition temperature range on low temperature side of the tertiary site and the secondary site and the decomposition temperature range on high temperature side of the primary site. The ranges in which the polymerization temperature and the kind of monomer selected can be enlarged by suitably varying the composition ratio of the tertiary site and the secondary site. By increasing the composition ratio of the tertiary site, for example, the temperature of the first-stage polymerization can be lowered. Conversely, by increasing the composition ratio of the secondary site, the first-stage polymerization can be carried out at a relatively high temperature.

There is no particular restriction on the polymerization temperatures in the present invention except for the requirement that they should be so selected that the polymerization of the two stages brings about efficient cleavage of the peroxy bond. Desirably, the first-stage polymerization temperature is in the range of from 50° C. to 80° C. and the second-stage polymerization temperature in the range of from 90° C. to 120° C. The amount of the organic peroxide added as an initiator is generally in the range of from 0.05 to 5.0% by weight, based on the total amount of the monomers being used. It is also permissible to use the radical polymerization initiator of this invention as a main component in combination with another organic peroxide.

For the polymerization contemplated by the present invention, any of the conventional methods such as, for example, suspension polymerization, solution polymerization, and bulk polymerization can be employed. Otherwise, a method of continuous polymerization may be employed when necessary.

Monomers which are effectively usable for the production of a block copolymer by the two-stage polymerization method of the present invention include vinyl chloride, vinylidene chloride, vinyl acetate, acrylic acid, methacrylic acid, acrylic esters, methacrylic esters, ethylene, propylene, acrylonitrile, methacrylonitrile, styrene, nucleus-substituted derivatives of styrene, $\alpha$-methyl styrene, vinyl pyrrolidone, butadiene, divinyl benzene, and maleimide, for example. Combinations of monomers which are effectively usable include block copolymers between vinyl chloride and acrylic or methacrylic acid or esters thereof, vinyl chloride and styrene, vinyl chloride and maleimides, acrylic or methacrylic acid or esters thereof and styrene, for example These are not the only monomers or combinations thereof which are usable.

When the production contemplated by this invention is carried out in an organic solvent, at least one member selected from the group consisting of aliphatic hydrocarbons, aromatic hydrocarbons, alcohols, ethers, ether esters, and ketones may be used as a polymerization solvent.

The polymerization initiator of this invention can be used as an initiator for the homopolymer or copolymer of vinyl chloride, acrylic or methacrylic acid or esters thereof, styrene, and ethylene, for example. In this case, the polymer can be obtained with a higher molecular weight than when an ordinary initiator is used. During the polymerization, generally for the purpose of efficiently carrying out the removal of the heat of reaction, the heat of polymerization must be kept at a fixed level throughout the entire duration of the polymerization. For this purpose, the polymerization rate must be fixed. Thus, there is generally employed the means of carrying out the polymerization by using a low-temperature active (quickly acting) initiator in combination with a high-temperature active (slow acting) initiator. Since the initiator of this invention possesses three active temperatures, the sole use of this initiator allows the polymerization rate to be kept uniform. For the polymerization of ethylene, the organic peroxide to be used as an initiator is generally desired to have a wide range of minimum initiator consumption, namely a small temperature dependency of the polymerization efficiency. When this requirement is met, the initiator can be used over a wide range of temperatures. Accordingly use of the organic peroxide having different decomposition temperatures as contemplated by the present invention proves to be advantageous.

By polymerizing monomers in two stages with the novel polymeric peroxide of this invention, the block copolymer can be easily obtained. The block copolymer which is formed by the polymerization using this specific polymerization initiator can be utilized extensively for the modification of the physical properties of various polymers through polymer blend and the modification of the physical properties of coating resins, for example.

The polymerization initiator of this invention is characterized in that it fulfils its function efficiently as an initiator even in homopolymerization to produce a polymer of a high molecular weight. It, therefore, enjoys a very high economic value.

Now, the present invention will be described more specifically below with reference to working examples. It should be noted that this invention is not limited by these examples. The initiators and the polymers involved in the working examples will be represented by the following abbreviations.

$\alpha$-TMA: 2,2,4-Trimethyladipic acid
$\gamma$-TMA: 2,4,4-Trimethyladipic acid
TMA: Generic term for $\alpha$-TMA and $\gamma$-TMA
$\alpha$-TMAC: 2,2,4-Trimethyladipic acid dichloride
$\gamma$-TMAC: 2,4,4-Trimethyladipic acid dichloride
TMAC: Generic term for $\alpha$-TMAC and $\gamma$-TMAC
25H: 2,5-Dimethylhexane-2,5-dihydroperoxide
25Y: 2,5-Dimethylhexyne-3-2,5-dihydroperoxide
DIBH Diisopropylbenzene dihydroperoxide
PA25H: Polyperoxy ester of TMA and 25H
PA25Y Polyperoxy ester of TMA and 25Y
PADIB: Polyperoxy ester of TMA and DIBH
SB25H: Polyperoxy ester of $\alpha$-n-butylsuberic acid and 25H
BPV: t-Butyl peroxy pivalate
PS: Polystyrene
PMMA: Polymethyl methacrylate
PVAc: Polyvinyl acetate The polymerization conversion was calculated from the amount of residual monomer determined by gas chromatography. The polymer molecular weight was calculated from the styrene content determined by gel permeation chromatography (GPC).

REFERENCE EXAMPLE 1

Production of TMA Mixture

TMA was produced by the oxidation of 3,3,5-trimethyl cyclohexanone with nitric acid. This TMA was methylesterified and subjected to GLC analysis. The ratio of α-TMA to γ-TMA (α/γ ratio) was 48:52. This mixture was recrystallized by 65% concentrated nitric acid to obtain a (α/γ ratio) 99:1 mixture and a (α/γ ratio) 31:69 mixture. These types of TMA were chlorinated by the conventional method using thionyl chloride to obtain various types of TMAC. These types of TMAC were used in the working examples cited below.

EXAMPLE 1

Into a four-neck flask having an inner volume of 200 ml and provided with a stirrer and a thermometer were charged 17.8 g (0.1 mol) of 2,5H and 40.9 g of water, which were cooled in ice, and 29.2 g (0.25 mol) of 48% KOH was added to the mixture with stirring Then, a mixed liquid of 22.5 g (0.1 mol) of a (α/γ ratio) 48:52 TMAC and 50 ml of ether was added dropwise to the stirred solution over a period of 30 minutes. Then, the reactants were left to react for one hour. The reaction mixture was combined with 50 ml of ether, washed first with an aqueous 10% NaOH solution and then with water, dehydrated with magnesium sulfate, and subsequently concentrated under a vacuum at a temperature below 20° C. to obtain 26.8 g of viscous liquid. The yield based on the TMAC was 81.3%.

By the conventional iodometry, this viscous liquid was found to have an active oxygen content of 8.76%.

The infrared absorption spectrum of this viscous liquid showed characteristic absorptions at 1,775 cm$^{-1}$ (C=O bond) and 860 cm$^{-1}$ (O—O bond). The chemical shift δ values of proton and their intensities found in the nuclear magnetic resonance spectrum of this viscous liquid were as follows.

| | | |
|---|---|---|
| a | 3H | 0.86 ppm |
| b | 6H | 0.94 ppm |
| c | 3H | 1.05 ppm |
| d | 6H | 1.09 ppm |
| e | 24H | 1.20 ppm |
| f | 4H | 1.48 ppm |
| g | 8H | 1.74 ppm |
| h | 1H | 1.91 ppm |
| i | 4H | 2.20 ppm |
| j | 1H | 2.50 ppm |

Thus, this viscous liquid was identified to be a polymeric peroxide composed of the following component units of Formula I, Formula I', and Formula IIa.

The weight average molecular weight of this polymeric peroxide was found to be 15,200.

Figure 1:
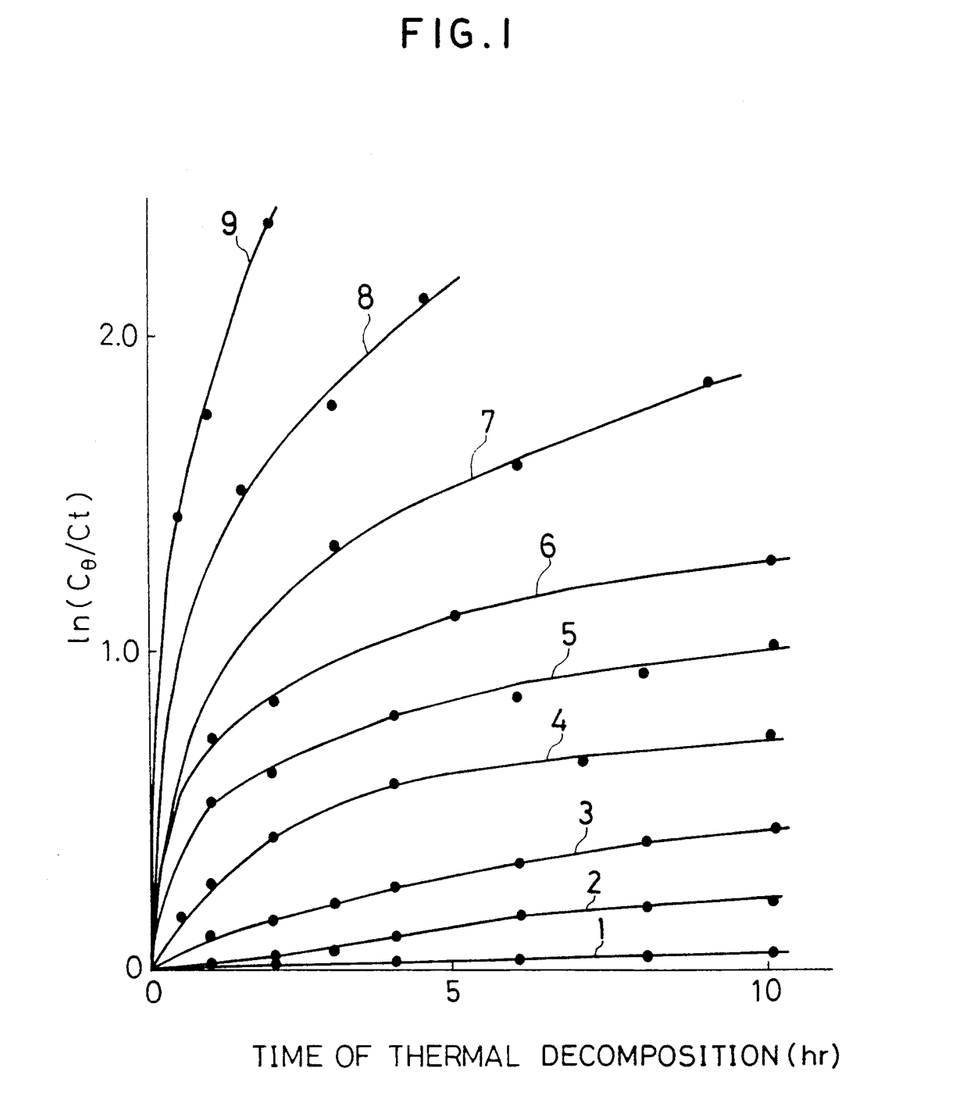
The drawing is a graph obtained showing the relationship between the logarithm of the ratio of decrease of the peroxide bond concentration of a polymeric peroxide produced in Example 1 and the time of thermal decomposition.

Subsequently, this polymeric peroxide was dissolved in cumene (0.10 mol/lit. of cumene solution) and the solution was subjected to thermal decomposition at temperatures in the range of from 40° C. to 120° C. The logarithm "ln (Cθ/Ct)" of the ratio of decrease in the peroxide bond concentration found by the iodometry was plotted against time. The curves obtained are shown in the drawing.

The curves 1, 2, 3, 4, 5, 6, 7, 8, and 9 are based on the data obtained respectively at the temperatures 40° C., 50° C., 60° C., 70° C., 80° C., 90° C., 100°C., 110° C., and 120° C. of thermal decomposition. In this graph, the horizontal axis represents the duration (hrs) of thermal decomposition and the vertical axis the scale of ln (Cθ/Ct). It was found by analysis of these curves that this polymeric peroxide possessed three species of peroxide bonds differing in thermal decomposition rates. The rate constants for the thermal decomposition and the 10-hour half-life temperatures are shown in Table 1.

TABLE 1

| Temperature (°C.) | kd$_1$[1] (hr$^{-1}$) | kd$_2$[2] (hr$^{-1}$) | kd$_3$[3] (hr$^{-1}$) |
|---|---|---|---|
| 40 | 0.0140 | | |
| 50 | 0.0800 | | |
| 60 | 0.236 | 0.0190 | |
| 70 | 0.995 | 0.0840 | |
| 80 | | 0.207 | 0.00620 |
| 90 | | 0.678 | 0.0195 |
| 100 | | | 0.0861 |
| 110 | | | 0.195 |
| 120 | | | 0.630 |
| 10-hour half-life temperature (°C.) | 50.3 | 69.8 | 99.9 |

[1] kd$_1$: Rate constant for thermal decomposition based on the peroxide group decomposed on the low temperature side.
[2] kd$_2$: Rate constant for thermal decomposition based on the peroxide group decomposed on the medium temperature range.
[3] kd$_3$: Rate constant for thermal decomposition based on the peroxide group decomposed on the high temperature side.

EXAMPLES 2 TO 6

Viscous liquids were obtained by faithfully following the procedure of Example 1, except that the amounts of 25H and TMAC and the (α/γ ratio) thereof were varied as indicated in Table 2.

They were tested for active oxygen content and average molecular weight in the same manner as in Example 1. The results are shown in Table 2. Each of these viscous liquids was identified from the results of infrared absorption spectrometry and nuclear magnetic resonance spectrometry to be a polymeric peroxide composed of the component units of Formula I, Formula I', and Formula IIa.

TABLE 2

| Example | Amount of raw materials used (mol) 25H | TMAC | α/γ ratio | Active oxygen content (%) | Yield (g) | (%) | Average molecular weight |
|---|---|---|---|---|---|---|---|
| 2 | 0.10 | 0.10 | 31:69 | 8.64 | 27.9 | 84.5 | 9200 |

TABLE 2-continued

| Example | Amount of raw materials used (mol) | | | Active oxygen content (%) | Yield | | Average molecular weight |
|---|---|---|---|---|---|---|---|
| | 25H | TMAC | α/γ ratio | | (g) | (%) | |
| 3 | 0.10 | 0.10 | 80:20 | 8.82 | 26.3 | 79.8 | 11200 |
| 4 | 0.10 | 0.10 | 99:1 | 8.89 | 27.5 | 83.2 | 13500 |
| 5 | 0.08 | 0.12 | 48:52 | 6.98 | 26.0 | 76.7 | 1300 |
| 6 | 0.11 | 0.09 | 48:52 | 9.54 | 28.3 | 85.1 | 2200 |

EXAMPLE 7

A viscous liquid weighing 29.2 g was obtained by faithfully following the procedure of Example 1, except that 17.4 g (0.1 mol) of 25Y was used in the place of 25H. The yield of this product based on the TMAC was 89.6%. The viscous liquid was found to possess an active oxygen content of 8.73%.

The infrared absorption spectrum of this viscous liquid showed characteristic absorptions at 1,775 cm$^{-1}$ (C=O bond) and 860 cm$^{-1}$ (O—O bond). The chemical shift δ values of proton and their intensities found in the nuclear magnetic resonance spectrum of this viscous liquid were as follows.

| | | |
|---|---|---|
| ⓐ | 3H | 0.86 ppm |
| ⓑ | 6H | 0.94 ppm |
| ⓒ | 3H | 1.05 ppm |
| ⓓ | 6H | 1.09 ppm |
| ⓔ | 2H | 1.48 ppm |
| ⓕ | 24H | 1.56 ppm |
| ⓖ | 1H | 1.91 ppm |
| ⓗ | 2H | 2.20 ppm |
| ⓘ | 1H | 2.50 ppm |

As a result, this liquid was identified to be a polymeric peroxide composed of the following component units of Formula I, Formula I', and Formula IIb.

By a test performed in the same manner as in Example 1, the average molecular weight of this polymeric peroxide was found to be 10,800.

Then, thermal decomposition of the polymeric peroxide was carried out by the same method as in Example 1. The 10-hour half-life temperature based on three different peroxide bonds were found to be 46.7° C., 70.3° C. and 96.2° C., respectively.

EXAMPLES 8 TO 10

Viscous liquids were obtained by faithfully following the procedure of Example 1, except that the amounts of 25Y and TMAC used and the (α/γ ratio) thereof were varied as indicated in Table 3. The amounts of the products obtained and the yields thereof were as shown in Table 3. The products were tested for active oxygen content and average molecular weight in the same manner as in Example 1. The results are shown in Table 3. From the results of infrared absorption spectrometry and nuclear magnetic resonance spectrometry of the viscous liquids, each of these viscous liquids was identified to be a polymeric peroxide composed of the component units of Formula I, Formula I', and Formula IIb.

TABLE 3

| Example | Amount of raw materials used (mol) | | | Active oxygen content (%) | Yield | | Average molecular weight |
|---|---|---|---|---|---|---|---|
| | 25H | TMAC | α/γ ratio | | (g) | (%) | |
| 8 | 0.10 | 0.10 | 31:69 | 8.43 | 25.8 | 79.1 | 9800 |
| 9 | 0.10 | 0.10 | 80:20 | 8.61 | 26.9 | 82.5 | 11400 |
| 10 | 0.11 | 0.09 | 48:52 | 9.63 | 29.2 | 89.0 | 1900 |

EXAMPLE 11

A viscous liquid weighing 29.7 g was obtained by faithfully following the procedure of Example 1, except that 22.6 g (0.1 mol) of DIBH was used in the place of 25H. The yield of this product based on TMAC was 78.6%. The active oxygen content of the viscous liquid was 7.83%.

The infrared absorption spectrum of this viscous liquid showed characteristic absorptions at 1,775 cm$^{-1}$ (C=O) bond and 860 cm$^{-1}$ (O—O bond). The chemical shift δ values of proton and their intensities found in the nuclear magnetic resonance spectrum of the viscous liquid were as follows:

| | | |
|---|---|---|
| ⓐ | 3H | 0.86 ppm |
| ⓑ | 6H | 0.94 ppm |
| ⓒ | 3H | 1.05 ppm |
| ⓓ | 6H | 1.09 ppm |
| ⓔ | 4H | 1.48 ppm |
| ⓕ | 24H | 1.67 ppm |
| ⓖ | 1H | 1.91 ppm |
| ⓗ | 4H | 2.20 ppm |
| ⓘ | 1H | 2.50 ppm |
| ⓙ | 8H | 7.50 ppm |

As a result, the compound was identified to be a polymeric peroxide composed of the following component units of Formula I, Formula I', and Formula IIc.

The average molecular weight of this polymeric peroxide was 11,800.

Then, this polymeric peroxide was tested for thermal decomposition rate. The 10-hour half-life temperatures were found to be 41° C., 62.4° C., and 87.7° C.

EXAMPLES 12 TO 14

Viscous liquids were obtained by faithfully following the procedure of Example 1, except that the amounts of DIBH and TMAC used and their ($\alpha/\gamma$ ratio) were varied as indicated in Table 4. The yield, active oxygen content, and average molecular weight are shown in Table 4. From the results of the infrared absorption spectrometry and the nuclear magnetic resonance spectrometry of the viscous liquids, each of these products was identified to be a polymeric peroxide composed of the component units of Formula I, Formula I', and Formula IIc, similarly to the product of Example 11.

TABLE 4

| Example | Amount of raw materials used (mol) | | | Active oxygen content (%) | Yield | | Average molecular weight |
|---|---|---|---|---|---|---|---|
| | DIB | TMAC | $\alpha/\gamma$ ratio | | (g) | (%) | |
| 12 | 0.10 | 0.10 | 31:69 | 7.70 | 32.6 | 86.2 | 15100 |
| 13 | 0.10 | 0.10 | 80:20 | 7.61 | 33.9 | 89.7 | 13000 |
| 14 | 0.11 | 0.09 | 48:52 | 8.22 | 32.3 | 83.9 | 2200 | polymer consequently formed was separated by filtration, washed with water, and dried, to obtain 98 g of a polymer. The produced polymer was sequentially fractionated by the Soxhlet extraction method to obtain a cyclohexane soluble (polystyrene), an acetonitrile soluble (polymethyl methacrylate), and a benzene soluble (styrene/methyl methacrylate block copolymer). The composition of the polymer, the molecular weight thereof determined by the GPC (as styrene), and the block efficiency of styrene are shown in Table 5.

The block efficiency of styrene was determined in accordance with the following formula.

Block efficiency of styrene = (amount of styrene polymer in the block copolymer/total amount of polymerized styrene) × 100

EXAMPLES 16 AND 17 AND COMPARATIVE EXPERIMENT 1

The procedure of Example 15 was repeated, except that the various compounds indicated in Table 5 were used as polymerization initiators in the place of PA25H and the various polymerization temperatures indicated in Table 5 were used instead. The results are shown in Table 5.

TABLE 5

| | Polymerization temperature (°C.) | | Polymerization initiator | | Composition of polymer | | | $Mw \times 10^{-4}$ | | | Block efficiency of styrene (%) |
|---|---|---|---|---|---|---|---|---|---|---|---|
| | First stage | Second stage | | (g) | PMMA | PS | PMMA-PS | PMMA | PS | PMMA-PS | |
| Example 15 | 75 | 110 | PA25H[1] | 0.7 | 18 | 23 | 59 | 39 | 42 | 68 | 56 |
| Example 16 | 75 | 110 | PA25Y[2] | 0.7 | 20 | 24 | 56 | 40 | 36 | 62 | 53 |
| Example 17 | 70 | 100 | PADIB[3] | 0.7 | 20 | 22 | 58 | 37 | 40 | 70 | 54 |
| Comparative Experiment 1 | 85 | 110 | SB25H | 0.7 | 32 | 28 | 40 | 30 | 48 | 65 | 40 |

[1] Polyperoxide synthesized in Example 1.
[2] Polyperoxide synthesized in Example 7.
[3] Polyperoxide synthesized in Example 11.

EXAMPLE 15

In a four-neck flask having an inner volume of 300 ml and provided with a stirrer, a thermometer and a reflux condenser, 0.5 g of a partially saponified polyvinyl alcohol was dissolved in 100 g of water and the air entrapped therein was displaced with nitrogen gas. Then a mixture consisting of 0.7 g of the PA25H synthesized in Example 1 and 55 g of methyl methacrylate was added to the flask and the resultant mixture in the flask was heated to 75° C. and subjected at this temperature to a first-stage suspension polymerization. After four hours' suspension polymerization, the resultant suspension polymerization liquid was cooled. The produced polymer was separated by filtration, washed with water, and dried, to obtain 52 g of a polymer. Then, 50 g of the polymer resulting from the first-stage polymerization was dissolved by stirring in 50 g of styrene at normal room temperature. In a flask identical in shape with the flask used in the first-stage polymerization, 150 g of water and 0.5 g of a partially saponified polyvinyl alcohol were dissolved in each other and the air entrapped therein was displaced with nitrogen gas. Then the separately prepared styrene solution was added into the flask and the resultant mixture in the flask was heated to 100° C. and subjected at the same temperature to polymerization for four hours. After the polymerization, the suspension polymerization solution was cooled. The

EXAMPLE 18

In the same flask provided with a stirrer, a thermometer and a reflux condenser, as used in Example 15, 0.5 g of a partially saponified polyvinyl alcohol was dissolved in 100 g of water and the air entrapped therein was displaced with nitrogen gas. A mixture consisting of 0.7 g of the PA25H synthesized in Example 1 and 50 g of vinyl acetate was added to the flask and the resultant mixture in the flask was heated to 75° C. and subjected at this temperature to a first-stage suspension polymerization. After three hours' polymerization, 50 g of styrene was added to the flask. The resultant mixture in the flask was heated to 110° C. over a period of one hour and subjected at this temperature to polymerization for four hours. After the polymerization, the resultant suspension polymerization solution was cooled. The polymer consequently formed was separated by filtration, washed with water, and dried, to obtain 99 g of a polymer.

The polymer was sequentially fractionated by the Soxhlet extraction method for a cyclohexane soluble (polystyrene), a 10/90 water/ethanol soluble (polyvinyl acetate), and a benzene soluble (styrene/vinyl acetate block copolymer). The composition ratio of the polymer and the molecular weight thereof (as styrene) and the block efficiency of styrene are shown in Table 6.

EXAMPLES 19 AND 20

The procedure of Example 18 was repeated, except that the compounds indicated in Table 6 were used as polymerization initiators in the place of the PA25H and the polymerization temperatures indicated in Table 6 were used instead. The results are shown in Table 6.

TABLE 6

| | Polymerization temperature (°C.) | | Polymerization initiator (g) | Composition of polymer | | | Mw × 10⁻⁴ | | | Block efficiency of styrene (%) |
|---|---|---|---|---|---|---|---|---|---|---|
| | First stage | Second stage | | PVAc | PS | PVAc-PS | PVAc | PS | PVAc-PS | |
| Example 18 | 75 | 110 | PA25H[1] 0.7 | 14 | 17 | 69 | 44 | 39 | 59 | 68 |
| Example 19 | 75 | 110 | PA25Y[2] 0.7 | 15 | 20 | 65 | 51 | 37 | 64 | 65 |
| Example 20 | 70 | 100 | PADIB[3] 0.7 | 12 | 17 | 71 | 55 | 41 | 62 | 71 |

[1] Polyperoxide synthesized in Example 1.
[2] Polyperoxide synthesized in Example 7.
[3] Polyperoxide synthesized in Example 11.

It is clear from the results of Examples 15 to 20 and Comparative Experiment 1 that block copolymers were obtained efficiently from polymeric peroxides produced in accordance with the present invention.

EXAMPLE 21

In an autoclave having an inner volume of 20 liters, 7,500 g of water, 1,000 g of butyl acrylate, 4 g of the PA25H synthesized in Example 1, and 3 g of methyl cellulose were placed and, with the air entrapped therein displaced with nitrogen gas, left to polymerize at 75° C. for four hours. The polymerization conversion was 99%. g of acrylonitrile and 1,500 g of styrene were added to the autoclave and resultant mixture was heated to 110° C. over a period of two hours, whereafter it was left to polymerize at 110° C. for four hours. The polymer consequently obtained was dehydrated and dried as conventionally practised, to produce a polymer powder. This polymer was pelletized by the use of an extruding device and the pellets were injection molded to prepare test pieces, which were tested for physical properties. The Izod impact strength was determined by the procedure of ASTM D256 and the tensile strength and the elongation were determined by the procedure of JIS K6871. The results are shown in Table 7.

EXAMPLES 22 AND 23 AND COMPARATIVE EXPERIMENTS 2 AND 3

The procedure of Example 21 was repeated, except that the compounds indicated in Table 7 were used as polymerization initiators in the place of the PA25H and the polymerization temperatures indicated in Table 7 were used instead. The results are shown in Table 7.

TABLE 7

| | Polymerization temperature (°C.) | | Polymerization initiator (g) | Izod strength, kg · cm/cm², with notch (23° C.) | Tensile strength kg/cm² (23° C.) | Elongation, % (23° C.) |
|---|---|---|---|---|---|---|
| | First stage | Second stage | | | | |
| Example 21 | 75 | 110 | PA25H[1] 4.0 | 34 | 450 | 54 |
| Example 22 | 75 | 110 | PA25Y[2] 4.0 | 35 | 470 | 51 |
| Example 23 | 70 | 100 | PADIB[3] 4.0 | 40 | 490 | 52 |
| Comparative Experiment 2 | 85 | 110 | SB25H 4.0 | 29 | 400 | 51 |
| Comparative Experiment 3 | | 65 | BPV 4.0 | 25 | 310 | 35 |

[1] Polyperoxide synthesized in Example 1.
[2] Polyperoxide synthesized in Example 7.
[3] Polyperoxide synthesized in Example 11.

EXAMPLE 24

In an autoclave having an inner volume of 20 liters, 7,500 g of water, 4 g of the PA25H synthesized in Example 1, and 3 g of methyl cellulose were placed and, with the entrapped air inside the autoclave displaced with nitrogen gas, the resultant mixture and 3,000 g of vinyl chloride added thereto were left to polymerize at 70° C. for eight hours. The polymerization conversion was 80%. The resultant polymerization mixture and 112.5 g of butyl acrylate and 112.5 g of methyl methacrylate added thereto were heated to 110° C. over a period of two hours. Then, they were left to polymerize at 110° C. for four hours. The polymer consequently obtained was dehydrated and dried by the conventional method, to obtain a polymer powder. This polymer was pelletized with an extruding device. The pellets were injection molded to prepare test pieces. The test pieces were evaluated for physical properties. The Izod impact strength was determined by the procedure of ASTM D256 and the tensile strength and the elongation were determined by the procedure of JIS K7113. The results are shown in Table 8.

EXAMPLES 25 AND 26

The procedure of Example 24 was repeated, except that the compounds indicated in Table 8 were used as polymerization initiators in the place of the PA25H and the polymerization temperatures indicated in Table 8 were used instead. The results are shown in Table 8.

COMPARATIVE EXPERIMENT 4

When the procedure of Example 24 was repeated, except that 4 g of SB25H was used as a polymerization initiator in the place of 4 g of PA25H and the polymerization temperature in the first stage was changed to 70°

C. and that in the second stage to 100° C., the polymerization was not completed. Thus, no product was available for evaluation of physical properties.

COMPARATIVE EXPERIMENT 5

The procedure of Example 24 was repeated, except that 4 g of BPV was used as a polymerization initiator in the place of 4 g of PA25H and the polymerization was carried out at 65° C. in the first and second stages alike. The results are shown in Table 8.

EXAMPLE 27

The procedure of Example 24 was repeated, except that 250 g of styrene was used in the place of 112.5 g of butyl acrylate and 112.5 g of methyl methacrylate in the second-stage polymerization. The results are shown in Table 8.

COMPARATIVE EXPERIMENT 6

The procedure of Comparative Experiment 4 was repeated, except that 250 g of styrene was used in the place of 112.5 g of butyl acrylate and 112.5 g of methyl methacrylate in the second-stage polymerization. The results are shown in Table 8.

COMPARATIVE EXPERIMENT 7

The procedure of Example 28 was repeated, except that 0.00573 g of SB25H (peroxide concentration 0.014 mol/liter) was used as a polymerization initiator in the place of 0.00511 g of PA25H. The conversions of polymerization found at intervals of one hour to the end of the eight hours' polymerization were 2.3%, 5.4%, 12.4%, 31.3%, 56.6%, 91.2%, 97.9% and 99.1%. The weight average molecular weight of the polymer at the end of the polymerization was 462,000.

COMPARATIVE EXPERIMENT 8

The procedure of Example 28 was repeated, except that 0.00487 g of BPV (peroxide concentration 0.014 mol/liter) was used as a polymerization initiator in the place of the PA25H. The conversions of polymerization found at intervals of one hour to the end of the eight hours' polymerization were 11.6%, 31.4%, 51.4%, 56.3%, 58.6%, 61.7%, 64.6%, and 69.2%.

It is clear from Example 28 and Comparative Experiments 7 and 8 that when the polymerization initiators of this invention are used in the polymerization of styrene, the polymerizations proceed at a fixed rate.

TABLE 8

| | Polymerization temperature (°C.) | | Polymerization initiator (g) | | Izod strength, kg · cm/cm$^2$, with notch (23° C.) | Tensile strength kg/cm$^2$ (23° C.) | Elongation, % (23° C.) |
|---|---|---|---|---|---|---|---|
| | First stage | Second stage | | | | | |
| Example 24 | 70 | 110 | PA25H[1] | 4.0 | 18 | 570 | 130 |
| Example 25 | 70 | 110 | PA25Y[2] | 4.0 | 14 | 540 | 120 |
| Example 26 | 60 | 100 | PADIB[3] | 4.0 | 16 | 550 | 120 |
| Comparative Experiment 4 | 70 | 110 | SB25H | 4.0 | — | — | — |
| Comparative Experiment 5 | 65 | | BPV | 4.0 | 3 | 430 | 90 |
| Example 27 | 70 | 110 | PA25H[1] | 4.0 | 12 | 530 | 110 |
| Comparative Experiment 6 | 65 | | BPV | 4.0 | 3 | 490 | 75 |

[1] Polyperoxide synthesized in Example 1.
[2] Polyperoxide synthesized in Example 7.
[3] Polyperoxide synthesized in Example 11.

It is clear from the results of Examples 21 to 27 and Comparative Experiments 2 to 6 that block copolymers excellent in mechanical strength are produced from the polymeric peroxides conforming to this invention.

EXAMPLE 28

A glass ampoule measuring 6 mm in inside diameter and 5 ml in inner volume was packed with a mixture of 2 ml of styrene and 0.00511 g of the PA25H synthesized in Example 1 (peroxide concentration 0.014 mol/liter) and, with the entrapped air therein displaced with nitrogen gas, was placed in a constant temperature bath and heated at a fixed temperature-increasing rate to 60° C. to 120° C. over a period of six hours and thereafter subjected to continued polymerization at 120° C. for two hours.

The polymerization conversions found at intervals of one hour to the end of the eight hours' polymerization were 8.2%, 19.7%, 31.2%, 48.3%, 68.9%, 81.9%, 94.2%, and 99.9%. The weight average molecular weight of the polymer at the end of the polymerization was 392,000.

What is claimed is:

1. An ester type polymeric peroxide having a group of the formula (I)

a group of the formula (I')

and a group of the formula (II)

wherein X stands for one member selected from the group consisting of —CH$_2$—CH$_2$—, —C≡C— and continuously bound such that I and I' occur randomly in alternation with II, having a (I):(I') molar ratio in the range of from 9:1 to 1:9 and a [(I)+(I')]:(II) molar ratio in the range of from 6:4 to 4:6, and having an average molecular weight in the range of from 1,000 to 20,000.

2. An ester type polymeric peroxide according to claim 1, wherein X is a —CH$_2$—CH$_2$— group.

3. An ester type polymeric peroxide according to claim 1, wherein X is a —C≡C— group.

4. An ester type polymeric peroxide according to claim 1, wherein X is a group.

5. A polymerization initiator for a vinyl . type monomer, using as an active component thereof an ester type polymeric peroxide having a group of the formula (I)

a group of the formula (I')

a group of the formula (II)

wherein X stands for one member selected from the group consisting of —CH$_2$—CH$_2$—, —C≡C— and continuously bound such that I and I' occur randomly in alternation with II, having a (I):(I') molar ratio in the range of from 9:1 to 1:9 and a [(I)+(I')]:(II) molar ratio in the range of from 6:4 to 4:6, and having an average molecular weight in the range of from 1,000 to 20,000.

6. An ester type polymeric peroxide according to claim 1, wherein X is a —CH$_2$—CH$_2$— group.

7. An ester type polymeric peroxide according to claim 1, wherein X is a —C≡C— group.

8. An ester type polymeric peroxide according to claim 1, wherein X is a group.

* * * * *